March 18, 1969  J. R. COX  3,434,062
DRIFT DETECTOR
Filed June 21, 1965  Sheet 1 of 7
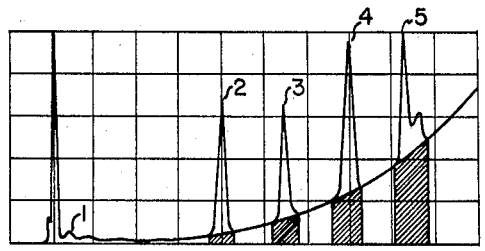
FIG. IA
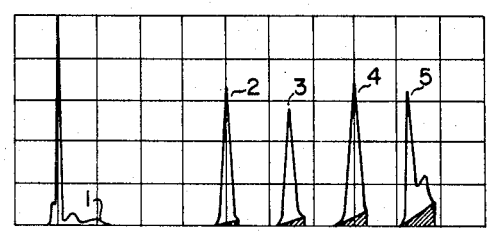
FIG. IB
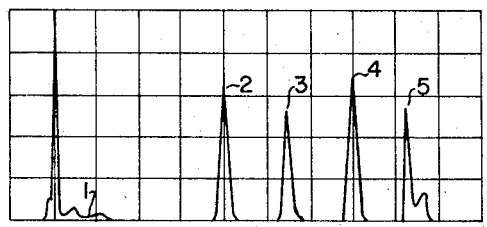
FIG. IC
INVENTOR
JAMES R. COX
BY
ATTORNEY March 18, 1969  J. R. COX  3,434,062

DRIFT DETECTOR

Filed June 21, 1965

INVENTOR.
JAMES R. COX

INVENTOR
JAMES R. COX

BY
ATTORNEY

March 18, 1969  J. R. COX  3,434,062
DRIFT DETECTOR

Filed June 21, 1965  Sheet 5 of 7

INVENTOR.
JAMES R. COX
BY

INVENTOR
JAMES R. COX

United States Patent Office 3,434,062
Patented Mar. 18, 1969

1

3,434,062
DRIFT DETECTOR
James R. Cox, 602 Downing St.,
Richardson, Tex. 75080
Filed June 21, 1965, Ser. No. 465,633
U.S. Cl. 328—163                                18 Claims
Int. Cl. H03k 5/18, 3/42; H04b 15/00

ABSTRACT OF THE DISCLOSURE

There is disclosed apparatus for generating a correction signal which is subtracted from an uncorrected signal having base line drift to provide a corrected signal having a constant base line. The apparatus includes means for producing a signal proportional to the derivative of an instrument output signal, a memory for storing the derivative signal and switching means responsive to the slope of the instrument output signal for selectively connecting and disconnecting the memory means into a drift correction circuit including a signal summing element and an integrator.

---

In various analytical testing instruments the output signal is recorded or displayed as a function of some independent variable, usually time. The resulting curve consists of a base line interrupted at intervals by peaks in the curve. In such recordings, the required quantity is most often the area bounded by the peak and the base line, i.e., the integral of the output signal over the time interval defined by the peak width. In other instances the peak height may be of interest. It will be apparent that one of the prerequisites for accurate determination of peak area or peak height is a straight, stable base line. If the base line drifts from the desired constant level, then the calculated peak area or height will be in error by a corresponding amount.

Similar information may be obtained, for example, by applying the output signal from the testing instrument to a digital integrator that measures the areas of peaks and prints only the area or a digital voltmeter that prints only the peaks. However, regardless of the manner in which the required quantity is obtained, correction for base line drift must be made if an accurate determination of the required quantity is to be made. The methods outlined above are typical in gas chromatography wherein the respective peak areas are a function of the quantity of the components eluded from the column. For purposes of illustration, the present invention is described with reference to a drift corrector especially designed for use in gas chromatography in which a strip recorder is utilized. It will be understood, however, that the principles of operation of the circuit set forth are broadly applicable to any instrument system wherein drift direction is required.

The present invention provides a drift detector which utilizes electronic circuitry to generate a correction signal to cancel any base line drift which may be present and thereby provide and maintain a straight, stable base line. The apparatus of the present invention is therefore capable of recognizing and differentiating between a desired peak signal which is to be displayed and an undesired change in signal due to base line drift. Further, the apparatus of the present invention is capable of supplying correction for the change in base line that occurs while a peak is present. The drift detector of the present invention is also capable of recognizing unresolved peaks such as those having "rabbit ears" in order that the output signal will not be corrected to zero.

In accordance with the principles of the present invention, there is provided means for indicating when the slope of the uncorrected signal from the chromatograph or other instrument is greater than a predetermined value, either positive or negative. The beginning of a peak is defined at the time at which the slope of the uncorrected signal becomes positive and greater than the predetermined value and the end of the peak is defined as being the time when the slope of the uncorrected signal is negative and has been in excess of the predetermined value followed by a negative and less than the predetermined value plus a desired time interval subsequent to the slope of the uncorrected signal being negative but less than the predetermined value. If the slope of the uncorrected signal again becomes positive and greater than the predetermined level within the time interval, it will indicate that the peak was not resolved but that the negative slope indicated the presence of a double peak or other non-symmetrical curve. There is also provided means for continuously storing and applying as a correcting signal a signal which is a function of the uncorrected signal to maintain a desired corrected signal out. In normal operation, the corrected signal suitably would be zero.

In accordance with one embodiment of the invention, during the emergence of a peak, the correcting signal which is stored at the beginning of the peak will be applied as a correcting signal during the existence of the peak, providing what is referred to as "flat" correction.

In accordance with another embodiment of the invention, there is further provided means for storing a signal which is a function of the slope of the uncorrected signal during all times that a peak is not in process. When a peak is in process, a signal which is a function of the slope of the uncorrected signal immediately prior to beginning of the peak is applied to the means for storing the correcting signal to continuously change the correcting signal during the existence of a peak at a rate determined by the slope of the uncorrected signal immediately prior to emergence of the peak. If the slope of base line does not change during the emergence of a peak, essentially perfect base line correction is obtained, preventing any uncorrected drift during the emergence of the peak. Normally, there will not be substantial change in the slope of the base line during the emergence of a peak.

Many objects and advantages of the invention will become readily apparent to those skilled in the art as the following detailed description of a preferred embodiment of the same unfolds when taken in conjunction with the appended drawings wherein like reference numerals denote like parts and in which:

FIGURE 1 is a curve showing a chromatograph signal which has not been corrected for base line drift;

FIGURE 1b is a curve illustrating a chromatograph signal in which "flat" correction for base line drift has been provided;

FIGURE 1c is a curve showing a chromatograph signal in which "slope" correction for base line drift has been provided;

FIGURE 10 is a schematic diagram further illustrating the correction circuit of FIGURE 9, while

As indicated previously, the output signal from various types of analytical and testing instruments, such as a gas chromatograph, is often recorded or displayed as a function of an independent variable, usually time. Thus, as shown in FIGURE 1a of the drawings, the resulting curve suitably consists of a base line interrupted at intervals by peaks 2–5. The required information is a function of the area bounded by the peaks and the base line, and is conventionally obtained by integrating the output signal over the time interval defined by the peak width. However, as illustrated in FIGURE 1a, if the base line drifts away from zero, substantial error is introduced as indicated by the cross-hatched areas existing under each of the peaks, since the integral of the signal will be that quantity between the curve defined by the peak and the zero line rather than the base line. It is apparent from the inspection of FIGURE 1a that in many instances the error will be greater than the portion of the signal underlying the various peaks.

In accordance with the present invention, there is provided circuitry for correcting drift of the base line which is capable of generating and subtracting from the instrument signal a correction signal equal to the amount of base line drift at all times when a peak is not present. During a peak, the correction signal will remain at a constant level set by the amount of drift at the beginning of the peak, providing what is referred to as "flat correction." As indicated in FIGURE 1b, substantial error (the area indicated in cross-hatching) may exist if only flat correction, is provided, due to the fact that the amount and the correction provided is only the amount of error present at the beginning of a peak. The apparatus of the present invention can be made capable of predicting the amount of base line change during a peak by measuring the slope of the base line preceding the peak and continuing to correct at this rate during the peak, providing what is referred to as "slope correction." When slope correction is utilized, substantially no error attributable to base line drift is present in the output signal, as illustrated in FIGURE 1c of the drawings.

Figure 2:
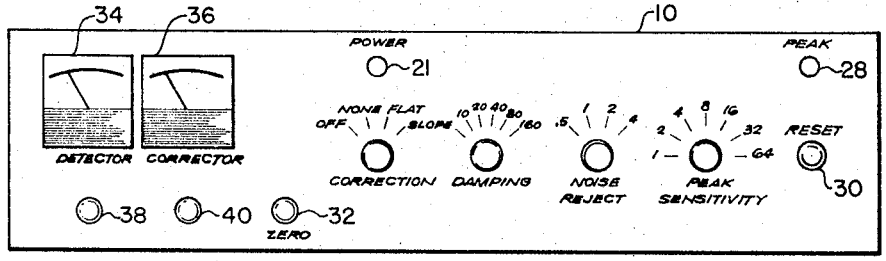
FIGURE 2 is a front elevation view of a panel of a drift corrector in accordance with a preferred embodiment of the present invention.
Figure 3:
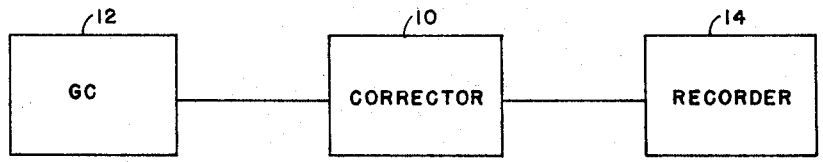
FIGURE 3 is a block diagram illustrating connections between a gas chromatograph, a drift corrector in accordance with the present invention, and a recorder.

Turning now to FIGURE 2 of the drawings, there is shown the front panel of a drift corrector 10 in accordance with a preferred embodiment of the present invention. As shown in FIGURE 3 of the drawings, the drift corrector 10 is adapted to be connected between a gas chromatograph 12, or similar instrument, and a recorder 14 for purposes of correcting base line drift in the output signal of the chromatograph 10 making is possible to obtain more accurate integration of peaks.

In accordance with the preferred embodiment of the invention, the drift corrector includes a CORRECTION switch 20 settable to four positions, "OFF," "NONE," "FLAT," and "SLOPE." When the correction switch 20 is in the "OFF" position, power to the drift corrector 10 is off and the input to the drift corrector 10 from the chromatograph 12 is connected directly to the output of the corrector 10, which is in turn connected to the recorder 14. In the position "NONE," the power is applied to the drift corrector 10, but the input of the corrector is connected directly to its output and an uncorrected chromatograph signal will be applied to the recorder. When the CORRECTION switch 20 is in the "FLAT" position and a peak is not present, the corrector circuit 10 will continuously subtract from the input signal a signal of a magnitude equal and opposite to the input signal. Upon occurrence of a peak, the amount of correction will remain of a constant amplitude determined by the amount of correction at the beginning of the peak, but there will not be a change in the correction signal during the peak. When the CORRECTION switch is placed in the "SLOPE" position, the correction signal will be changed during the presence of a peak at a constant rate which is determined by the correction rate immediately preceding the peak.

Lamp 21 indicates when power is applied to the drift connector circuitry and should be lit for any of the positions of CORRECTION switch 20 except "OFF." The DAMPING control 22 is effective only when the slope mode of correction is used. As mentioned above, during the presence of a peak, the correction signal is changed at a constant rate which is determined by the correction rate preceding the peak when the drift detector is operated in the slope correction mode. The DAMPING control 22 varies the time interval over which the correction rate is determined, suitably from 5 to 160 seconds. The amount of noise present and the sensitivity to change in slope desired will, of course, determine the setting of the DAMPING control 22.

The NOISE REJECT control 24 controls the sensitivity of the slope detector incorporated in the corrector 10 to amplitudes of signals applied from the chromatograph 12. Thus, if very little noise is present, the NOISE REJECT control can be adjusted for maximum sensitivity and extremely small peaks will be recognized by the slope detector unit. On the other hand, if a substantial amount of noise is present, the sensitivity of the unit can be reduced substantially to prevent spurious operation of the slope detector unit.

The PEAK SENSITIVITY control 26 is also a part of the slope detection circuitry and its setting determines what rate of slope will be defined as a peak. Random drifting of the base line and small trace peaks which do not exceed this slope rate will automatically be corrected to a stable base line, but greater slope rates will be treated and seen as peaks. This control, in accordance with the preferred embodiment of the invention, is calibrated from 1 to 64, representing the drift in percent of full scale per minute which will be corrected. Thus, the PEAK SENSITIVITY control 26 controls the amount of slope required to indicate emergence of a peak and the NOISE REJECT control 24 controls the change in amplitude required during the existence of slope at least equal to that set by the control 26 to indicate the emergence of a peak.

The lamp 28 indicated by the legend PEAK indicates when a peak is emerging. The RESET switch 30 is effective when depressed to turn the lamp 28 off and cause the signal to be corrected to zero.

The RECORDER ZERO knob 32 operates a potentiometer used for electrically aligning the drift corrector output with the recorder such that the output signal of the drift corrector 10 when a peak is not present will be recorded as zero signal level. The DETECTOR METER 34 and the CORRECTOR meter 36 each indicate whether particular portions of the drift corrector circuitry are operating under optimum conditions. For best results, it is preferred that the associated circuitry be adjusted such that the needles of the meters 34 and 36 be near the center point and controls 38 and 40 are provided for adjusting variable resistors incorporated in the drift corrector circuitry to obtain desired optimum operating conditions.

Figure 4:
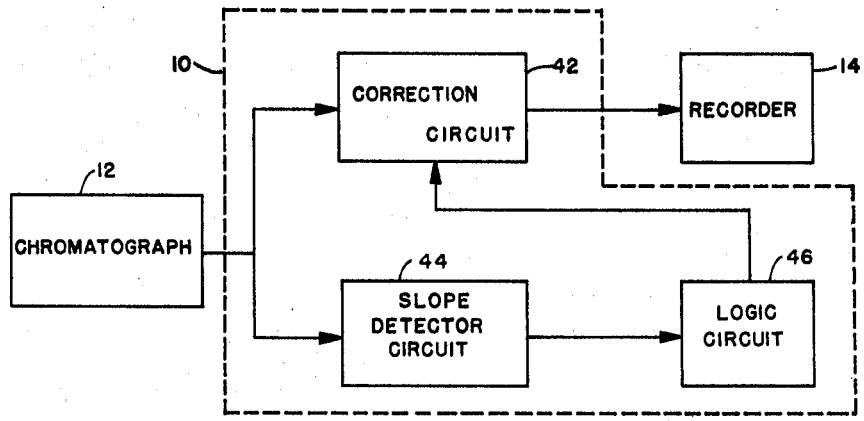
FIGURE 4 is a block diagram illustrating the principal functional elements of the drift corrector of the present invention.

Turning now to FIGURE 4 of the drawings, it can be seen that the drift detector 10 can be considered as comprising three functional circuits, a correction circuit 32, a slope detector circuit 44 and a logic circuit 46. The uncorrected signal from the chromatograph 12 is applied to both the correction circuit 42 and the slope detector circuit 44. The correction circuit 42 performs the function of accepting an input signal with base line drift and providing an output signal which has been corrected to remove the base line drift. The slope detector circuit 44 and logic circuit 46 operate to provide switching signals necessary for proper operation of the correction circuit 42. When a switching signal is generated by the slope detector circuit and logic circuit to indicate that a peak is not emerging, the correction circuit is effective to generate a correction signal equal to the value of the input signal which is subtracted from the input signal to maintain the output of the drift connector zero even though the input may change. When the slope detector circuit and logic circuit indicate that a peak is emerging, the correction circuit is effective to subtract from the input signal during the existence of the peak a correction signal equal in magnitude to the correction signal at the beginning of the peak if flat correction is utilized. If the slope correction is to be provided, the correction circuit will also be effective to change the correction signal existing at the time a peak begins at a rate determined by the slope of the uncorrected signal prior to beginning of the peak.

Figure 5:
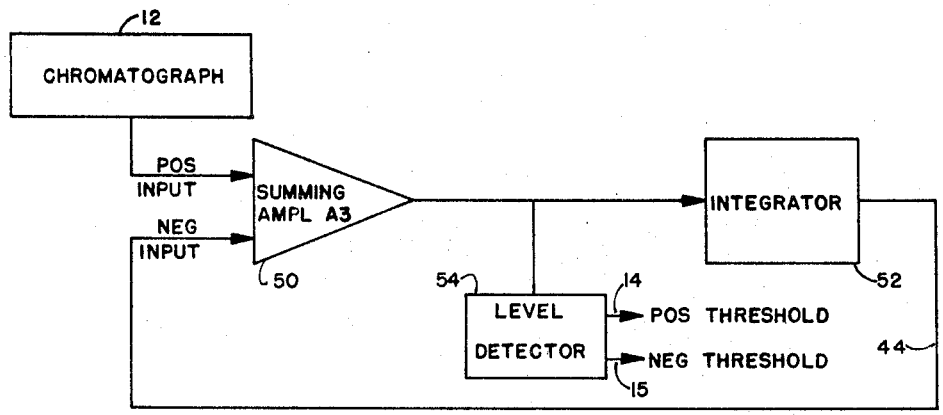
FIGURE 5 is a block diagram of the slope detector circuit of the present invention.

The slope detector circuit 44 of the present invention is shown in FIGURE 5 of the drawings and can be seen to comprise a summing amplifier 50 whose output is connected to an integrator 52. The output of the integrator 52 is applied to the amplifier 50 as one of its inputs, the other input to the amplifier 50 being the uncorrected signal from the chormatograph 12. The amplifier 50 is one having an extermely high gain such that the amplifier 50 will saturate if there is substantial difference between the two input signals to the amplifier 50. To prevent saturation of the amplifier 50, therefore, the output of the integrator 52 must be substantially equal to the output of the chromatograph 12. Since the output of the integrator 52 is the integral of the output of the amplifier 50, the output of the amplifier 50 must be the derivative of the output of the chromatograph 12 and the output of the amplifier 50 will therefore represent the slope of the base line. The level detector 54 is responsive to the sign and amplitude of the output of the amplifier 50 and provides output signals responsive to the output of the amplifier 50 being in excess of a predetermined level, either positive or negative.

Figure 6:
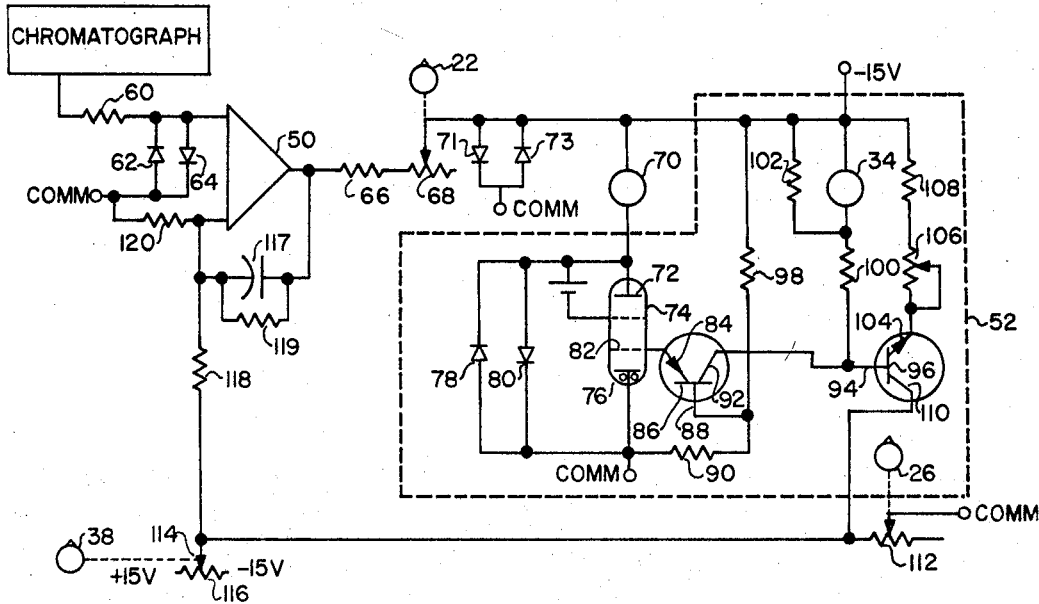
FIGURE 6 is a schematic diagram further illustrating the slope detector circuit of FIGURE 5.

A preferred embodiment of a slope detector circuit 44 in accordance with the invention is shown schematically in FIGURE 6 of the drawings, except for the details of the amplifier 50 which are not shown. It will be appreciated that the amplifier 50 is of a well known type of which many commercial models are available. In accordance with one specific example of the invention, the amplifier 50 actually utilized was a type AD03 different amplifier manufactured by Fairchild Camera and Instrument Corporation.

As shown in FIGURE 6 of the drawings, the output of the chromatograph 12 is suitably applied to one input of the amplifier 50 through a resistor 60. The input of the amplifier 50 is suitably connected to a point of common potential through oppositely poled parallel connected diodes 62 and 64. It will be readily apparent that the maximum voltage that will be possible to apply to the input of the amplifier 50 will never be in excess of the forward voltage drop of the diodes 62 and 64, limiting the amplitude of voltage applied to the amplifier 50 to a very low value and thereby protecting the input of the amplifier against excessive voltage. The output of the amplifier 50 is connected through resistor 66 and a variable resistor 68 to one side of a meter 70. Variable resistor 68 is controlled by the NOISE REJECT control 22 on the control panel of the drift corrector panel. The juncture between the meter 70 and the variable resistor 68 is also connected through oppositely poled, parallel connected diodes 71 and 73, limiting the maximum potential which will appear across the meter 70 and a solion tetrode 74. The other side of the meter 70 is connected to the input electrodes 72 of the solion tetrode 74.

The meter 70 comprises a part of a meter relay further including a light source (not shown) and two photosensitive devices (also not shown). Light will impinge upon the two photosensitive devices as long as the deflection of the meter from the center position does not exceed a set amount. Deflection of the meter in either direction in excess of the predetermined amount will result in one of the photosensitive devices being shielded from the light.

The word "solion" is the acronym given to a family of electrochemical devices in which a number of different effects are achieved by movement of ions in solution. Solion tetrodes are disclosed in U.S. Patent No. 3,021,482. The performance of the solion tetrode as an electrical readout integrator is well known and may be expressed mathematically in the form:

$$I_o(t) = KI_i(t)dt$$

where K is the sensitivity constant of the integrator, $I_i$ is the input current and $I_o$ is the output current.

The common electrode 76 of the tetrode 74 is connected to common with a pair of parallel connected oppositely poled diodes 78 and 80 connected between the input electrode 72 and the common electrode 76. The diodes 78 and 80 limit the maximum potential which can be impressed across the input and common electrodes, preventing the potential which may appear across the tetrode 74 becoming sufficiently high to damage the device. The readout electrode 82 of the device is connected to the emitter 84 of transistor 86.

The base electrode 88 of the transistor 86 is connected through resistor 90 to common, and the collector electrode 92 of transistor 86 is connected to base 94 of transistor 96. Transistor 86 is suitably of PNP type and the transistor 96 is suitably of NPN type. The base of transistor 86 is also connected through resistor 98 to a source of voltage, suitably −15 volts.

The −15 volts voltage source is also connected through the meter 34 positioned on the panel (as described previously with regard to FIGURE 2) and resistor 100 to the juncture between the collector of transistor 86 and the base of transistor 96. Resistor 102 is connected in shunt with the meter 34. The emitter 104 of transistor 96 is connected through variable resistor 106 and resistor 108 to the −15 volts supply voltage. The collector 110 of the transistor 96 is connected to common through a variable resistor 112. The variable resistor 112 is controlled by the peak sensitivity control 26 on the panel of FIGURE 2. The collector 110 of transistor 96 is also connected to the tap 114 of a potentiometer 116. One side of potentiometer 116 is suitably connected to +15 volts and the other side of potentiometer 116 is suitably connected to −15 volts. The position of the tap 114 is controlled by the METER ADJUST knob 38. The collector of transistor 96 is also connected through a resistor 118 and resistor 120 to common, with the juncture between resistors 118 and 120 being connected to the second input to amplifier 50. Resistor 119, which is suitably shunted by filter capacitor 117, provides a negative feedback path which establishes the gain of amplifier 50.

The operation of the circuit of FIGURE 6 is as follows.

If the amplitude of the signal applied to one input of the amplifier 50 from the chromatograph becomes greater than the amplitude of the signal applied to the amplifier 50 from the integrator, a signal will appear at the output of the amplifier 50. As mentioned previously, the amplifier 50 is one having extremely large, and preferably near infinite gain, such that an extremely small difference in these two signal levels will produce a substantial output signal. The output signal from the amplifier 50 will cause current to flow through a path comprising resistor 66, resistor 68, meter 70, the input electrode of solion 74 and the common electrode of solion 74. The greater the slope of the signal from the chromatograph, the greater will be the difference between the two input signals and the larger the output signal from the amplifier 50. If the slope of the signal from the chromatograph is equal to or in excess of that arbitrarily chosen as indicating the emergence of a peak, the voltage at the output of the amplifier 50 will be of sufficient amplitude that current flowing through meter 70 will deflect the needle of meter 70 sufficiently that the light of the meter 70 will no longer impinge upon one of the photodiodes associated therewith and electrically connected in the logic circuit 46. The meter relay will thereby provide threshold signals to the logic circuit indicating the presence of an uncorrected signal having a slope in excess of the predetermined level. In this instance, a positive threshold signal will be provided, indicating the beginning of a peak.

Also, the flow of current in the output circuit of the amplifier 50 will continuously cause a transfer of measured species from the readout compartment of the solion tetrode 74 to the input compartment as the voltage at the output of amplifier 50 charges toward positive, resulting in a change in the readout current of the solion tetrode 74. The resultant decrease in readout current of the tetrode 74 results in the transistors 86 and 96 being driven to a less highly conductive state, resulting in an increase in the potential applied to the input of the amplifier 50 from the integrator 52 (actually a decrease in a negative signal) to balance out the increase in the signal applied from the chromatograph.

If the amplitude of the signal applied to the amplifier 50 from the chromatograph should decrease, indicating a negative slope in the curve, the output of the amplifier 50 will charge toward negative, resulting in a reversal in the direction of current flow in the output circuit of the amplifier 50 as compared to that described with regard to an increase in the signal applied to the amplifier from the chromatograph. The meter 70 will, therefore, be deflected in an opposite direction and measured specie will be transferred from the input compartment to the readout compartment of the solion tetrode 74. As measured specie is transferred from the input compartment to the readout compartment, the readout current will increase and transistors 86 and 96 will become more conductive, resulting in a decrease in the signal applied to the input of the amplifier 50 from the integrator 52.

If the signal from the chromatograph is decreasing at least at a predetermined rate, current flowing through the meter 70 will be sufficient that a signal will be applied to the logic circuit of a character to indicate that a peak has reached a maximum amplitude point and is decreasing at that time. The slope detector circuit 44 is therefore effective to apply to the logic circuit signals indicating that either the slope of the signal from the chromatograph is positive and in excess of a predetermined value or negative in excess of a predetermined value. For reasons that will become apparent as the description continues to unfold, the meter 70 is preferably provided with a stop to prevent movement of the needle in a direction indicating negative slope past the predetermined level in order that the light beam will be continuously interrupted so long as the negative slope indicated is in excess of the set level.

Figure 7:
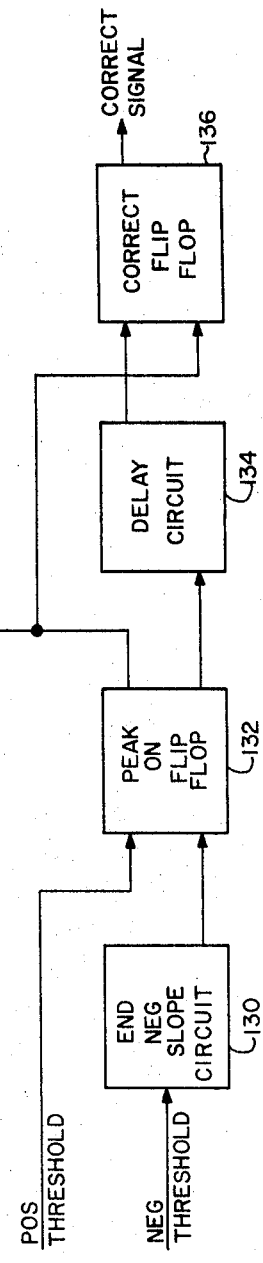
FIGURE 7 is a block diagram of the logic circuit of the drift corrector of the present invention.

The logic circuit 46 is shown in block diagram form of FIGURE 7 of the drawings and can be seen to comprise a circuit 130, designated as the end negative slope circuit which is responsive to the negative threshold signal produced by the slope detector circuit. The output of the end negative slope circuit 130 is applied to reset a peak on flip-flop 132. The peak on flip-flop 132 receives a set signal responsive to the presence of a positive threshold signal at the level detector 54 of the slope detector circuit 44.

There is also provided a delay circuit 134 and a correct flip-flop 136. When a positive threshold signal is applied to the set input of flip-flop 132 which indicates that a peak is present, a signal is available at the output of flip-flop 132. The signal indicating the presence of a peak is applied to reset the correct flip-flop 136 and provide a "peak on signal" to the correction circuit.

The end negative slope circuit 130 suitably comprises a Schmitt trigger circuit which is operated responsive to the beginning of a negative threshold signal and returned to its original state at the end of the negative threshold signal. It will be noted that the end of the negative threshold signal will normally indicate the end of a peak. When the Schmitt trigger circuit included within the end negative slope circuit 130 returns to its original state at the end of the negative threshold signal, a reset signal is applied to the reset input of the peak on flip-flop 132. When the reset signal is applied to the reset input of the flip-flop 132, the peak on signal is removed and a signal is applied to the delay 134. The delayed signal is applied from the delay 134 to the set input of correct flip-flop 136. When a signal is applied to the set input of correct flip-flop 136, flip-flop 136 will provide a "correct signal" to the correcting circuitry. It will be noted that the "correct signal" will be available at all times when flip-flop 136 is set and that each time the peak on signal is removed, a correct signal will appear at the end of the time interval determined by delay 134.

From the above, it can be seen that the logic circuit is responsive to the deflection of the meter 70, the slope detector circuit 44 and logic circuit 46 being optically coupled in accordance with the preferred embodiment of the invention. The logic circuit 46 operates upon signals received from the slope detector circuit 44 to determine the pressure of a peak, and generates appropriate signals to energize lamp 21 when a peak is present or, when a peak is not present, to apply an appropriate signal to the correction circuit 42.

Figure 8:
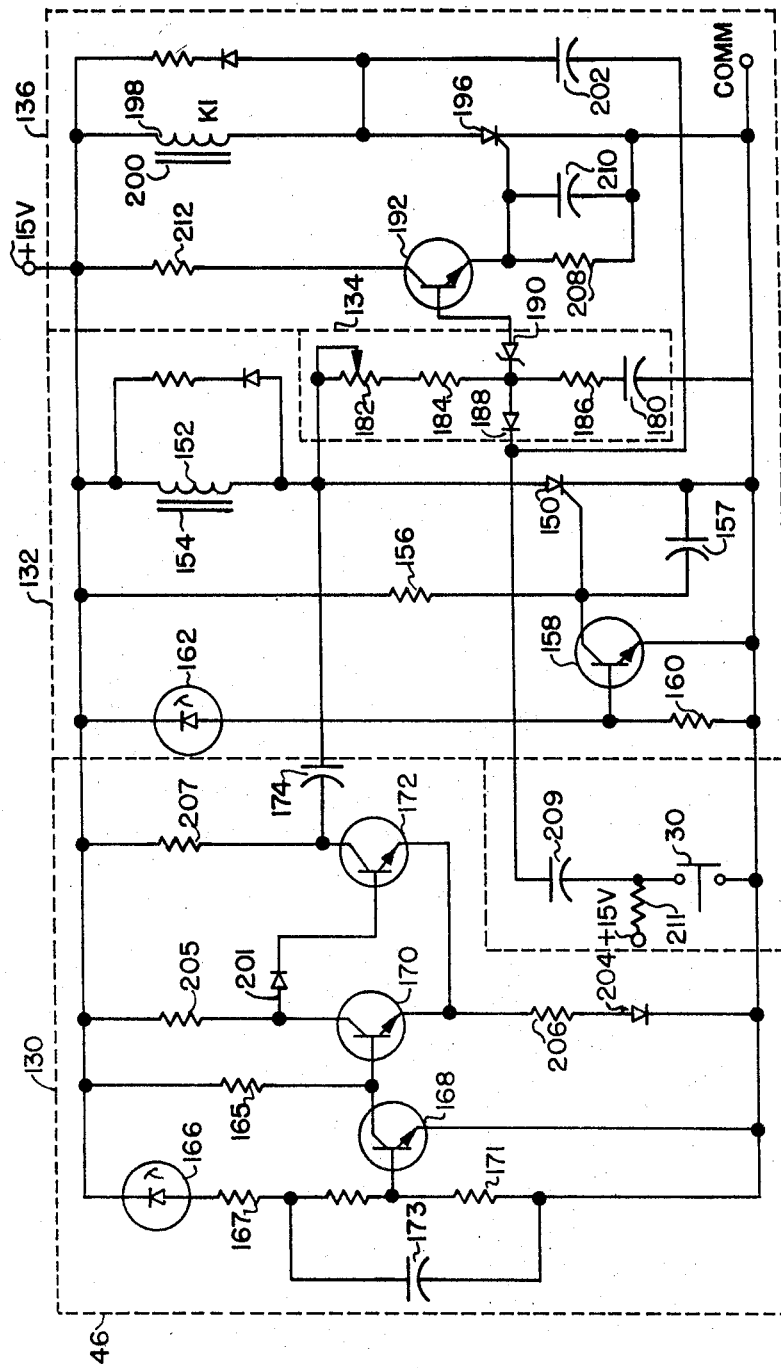
FIGURE 8 is a schematic diagram further illustrating the logic circuit of FIGURE 7.

The logic circuit 46 is shown schematically in FIGURE 8 of the drawings. In accordance with this particular embodiment of the invention, a silicon controlled rectifier 150 is utilized. The coil 152 of relay 154 is connected in series with the silicon controlled rectifier 150 between a source of positive votage, suitably +15 volts, and common. A resistor 156 and the emitter-collector circuit of transistor 158 are connected in series, also between +15 volts and common, for applying to the gate of the silicon controlled rectifier 150 a positive voltage to bias the silicon controlled rectifier 150 on when the transistor 158 is biased off. Capacitor 157 is connected in shunt with the emitter-collector circuit of transistor 158. The base of the transistor 158 is connected to the juncture point between a resistor 160 and a photosensitive device 162. When light impinges upon the photosensitive device 162, it will exhibit a low resistance, causing transistor 158 to be biased on.

The above defined circuitry comprises the peak on flip-flop 132. The photoresistive device 162 comprises a part of meter relay 70 of the slope detector circuit 44 and light impinges upon the photoresistive device 162 at all times except when the slope of the signal applied to the amplifier 50 from the chromatograph 12 is positive and of sufficient value to produce a positive threshold indication from the level detector of the slope detector 44. It will therefore be seen that the peak on flip-flop 132 is optically coupled to the slope detector circuit 44.

The end negative slope circuit 130 can be seen to comprise transistors 168, 170 and 172. The collector of transistor 168 is connected to the base of transistor 170 and through resistor 165 to a source of +15 volts, the emitter of transistor 168 being connected to common. There is also provided a series circuit comprising photoresistive device 166, resistors 167, 169 and 171 which is connected between the source of +15 volts and common. Capacitor 173 is connected in shunt with resistors 169 and 171. The juncture between resistors 169 and 171 is connected to the base of transistor 168.

Transistors 170 and 172 are connected to form a conventional Schmitt trigger circuit. Thus, the collector of transistor 170 is connected through resistor 205 to a source of +15 volts and through diode 201 to the base of transistor 172. The emitter of transistor 170 is connected to the emitter of transistor 172, with both being connected through resistor 206 and diode 204 to common. The collector of transistor 172 is connected through resistor 207 to +15 volts and through capacitor 174 to the anode of silicon controlled rectifier 150.

As shown, the reset switch 30 is normally open with one terminal thereof being connected to common and the other terminal being connected through capacitor 209 to the anode of silicon controlled rectifier 150. The juncture between switch 30 and the capacitor 209 is connected through resistor 211 to a source of +15 volts.

The correct flip-flop 136 comprises the right most portion of FIGURE 8 and includes silicon controlled rectifier 196. The anode of silicon controlled rectifier 196 is connected through coil 198 of relay 200 to +15 volts. The anode of silicon controlled rectifier 196 is also connected through capacitor 202 to the anode of silicon controlled rectifier 150. The cathode of silicon controlled rectifier 196 is connected to common and the gate electrode of silicon controlled rectifier 196 is connected to the emitter of transistor 192. Parallel connected resistor 208 and capcitor 210 are connected between the gate electrode and cathode of silicon controlled rectifier 196. The collector of transistor 192 is connected through resistor 212 to a source of +15 volts, the base of transistor 192 being connected through Zener diode 190 and diode 188 to the anode of silicon controlled rectifier 150.

Diodes 188 and 190 can be considered as being a portion of the delay circuit 134, which also comprises variable resistor 182, resistors 184, 186 and capacitor 180 connected in series between the anode of silicon controlled rectifier 150 and common. The juncture between diodes 188 and 190 is common to the juncture between resistors 184 and 186.

The operation of the logic circuit 46 is as follows. In the absence of a peak, the silicon controlled rectifier 196 will normally be conductive permitting current to flow through the coil of relay 200 to energize relay 200, causing contacts within the correction circuit 42 to be closed to permit the signal applied to the recorder to be corrected to zero. Transistor 158 will be biased on and silicon controlled rectifier 150 will be in its off or high impedance state. Transistor 168 will also be biased on, transistor 170 will be biased off and transistor 172 will be biased on. The contacts of relay 154, which comprise a part of the correction circuit 42, will be open and power will not be applied to the peak lamp 28. Relay 200 will be energized, and the contacts of relay 200 which are also a part of the correction circuitry 42 will be closed, causing the correction circuitry to continuously provide correction to maintain the signal applied to the recorder at zero.

Upon the emergence of a peak, the meter 70 will be deflected in a direction indicative of a positive slope. When the slope becomes sufficiently large to indicate the emergence of a peak, the needle of the meter 70 will pass in front of the photosensitive device 162. The photosensitive device 162, as mentioned above, will exhibit a low resistance, causing the transistor 158 to be biased on, at all times when light impinges upon the device. Farther, light impinges upon the photosenstive device 162 at all times except when the slope of the signal applied to the aplifier 50 (of the slope detector circuit 44) from the chromatograph 12 is positive and of sufficient value to produce a positive threshold indication. Thus, when the slope of the output of the chromatograph becomes sufficiently positive to indicate the beginning of a peak, the needle will pass in front of the photosensitive device 162, interrupting the beam of light and causing resistance of the photosensitive device 162 to become quite large. The increase in resistance of the device 162 will bias the transistor 158 to a less conductive state. When the transistor 158 becomes less conductive, its collector will become more positive, causing the silicon controlled rectifier 150 to turn on. It will be noted that the silicon controlled rectifier will remain on even if the needle should move from its position in front of the device 162

The silicon controlled rectifier 150, as mentioned above, is connected in series with the coil 152 of relay 154 between a source of +15 volts and common and thereby controls the energization of relay 154. Thus, when the silicon controlled rectifier 150 is turned on, it will permit current to flow through the coil 152 of relay 154, energizing the relay. When relay 154 is energized, its contacts which are electrically a part of the correction circuit 42 will close, causing the PEAK lamp 28 to be lit. Also, when the silicon controlled rectifier 150 turns on, its anode will become less positive, biasing transistor 192 off and removing the signal from the gate of silicon controlled rectifier 196. The change in potential of the anode of silicon controlled rectifier 150 is differentiated by the capacitor 202 and applied to the anode of silicon controlled rectifier 196, causing the silicon controlled rectifier 196 to turn off. When silicon controlled rectifier 196 turns off, the relay 200 will be de-energized and the contacts of relay 200 will open. Thus, the emergence of a peak will be detected and the correction circuit 42 operated to permit the passage of the peak.

Following the time at which the maximum instantaneous amplitude of the peak is reached, the slope of the signal will become negative. The photosensitive device 166 will be shielded from the light by the needle of meter 70 when the negative slope becomes sufficiently great to cause deflection of the needle of the meter 70 to a point set as the negative threshold. The meter 70 is suitably provided with a stop at the negative threshold point in order that photosensitive device 166 will be continuously shielded from light when the current flowing through the meter is at least sufficient to cause deflection of the meter needle to the stop.

The resistance of the photosensitive device 166 will increase when the device is shielded from light, causing the transistor 168 to be biased off. It will be noted that the transistor 168 is biased on when the resistance of the photosensitive device 166 is low. When the transistor 168 is biased off due to an increase in the resistance of the photosensitive device 166, it will apply a signal to the transistor 170, causing transistor 170 to be biased on. As transistor 170 begins to conduct, it will cause transistor 172 to be biased off and result in an increase in the voltage at the collector of transistor 172. The increase in positive voltage of the collector of transistor 172 is differentiated by capacitor 174 to form a positive pulse which passes through the silicon controlled rectifier 150 to common. However, since silicon controlled rectifier 150 is in its conductive state, the positive pulse will not change the state of the circuit.

At the end of the peak, the slope of the signal will become less negative, resulting in light again impinging upon the photosensitive device 166 and causing transistor 168 to be biased on. When transistor 168 is biased on, it will cause transistor 170 to be biased off, resulting in transistor 172 being turned on again. As transistor 172 is changed from the non-conductive to the conductive state, its collector will become less positive. The change in potential of the collector of transistor 172 is differentiated by capacitor 174 and applied to the anode of silicon controlled rectifier 150 as a negative going pulse which is effective to turn silicon controlled rectifier 150 off. It will be noted that light will be impinging upon the photosensitive device 162 at this time, causing transistor 158 to be biased on and preventing a gate signal being applied to the gate of silicon controlled rectifier 150. Thus, when the silicon controlled rectifier is turned off by the negative pulse and applied through capacitor 174, it will remain off until a signal is again applied to its gate electrode by the transistor 158 being turned off.

When silicon controlled rectifier 150 turns off, current will no longer flow through winding 152 of relay 154 and the contact of relay 154 will open, causing lamp 21 to no longer be lit. Also, the anode of silicon controlled rectifier 150 will be at a potential of substantially +15 volts, providing a voltage effective to charge the capacitor 180 through a charge path comprising variable resistor 182, resistor 184 and resistor 186. The diode 188 is poled to prevent the charge of capacitor 180 directly from the anode of silicon controlled rectifier 150 through resistor 186. When the capacitor 180 is charged to a voltage in excess of the Zener voltage of diode 190, the transistor 192 will be biased on. Thus, the resistors 182, 184 and 186, in conjunction with capacitor 180, provide a desired time delay between the end of a peak, as indicated by the end of a negative threshold signal at the time at which transistor 192 is turned on.

When transistor 192 is turned on, it will apply a gate voltage to silicon controlled rectifier 196, causing silicon controlled rectifier 196 to return to a conductive or low impedance state. When silicon controlled rectifier 196 returns on, relay 200 will again be energized and contacts associated with relay 200 will close within the correction circuit 42 to cause the correction circuit to again correct the incoming signal from the instrument to a signal of zero base line which is applied to the recorder.

The time delay between the end of a peak, as indicated by the negative threshold signal being removed, it is important in many applications in that it permits the drift corrector to differentiate between the end of a peak and an unresolved peak. This is true because if the slope of the signal from the recorder should again exceed positive threshold prior to the end of the time delay, the silicon controlled rectifier 150 will again be biased on, discharging the capacitor 180 through resistor 186 and diode 188, thereby preventing transistor 192 applying a signal to cause the silicon controlled rectifier 196 to be biased on. It will be noted that so long as the silicon controlled rectifier 196 is in its non-conductive state, the correction circuit will permit a peak to be passed and will not correct the signal applied to the recorder to zero until the silicon controlled rectifier 196 is again placed in its conductive state.

From the above, it can be seen that in response to signals from the slope detector indicating either that the slope of the chromatograph signal is positive or negative and in excess of desired threshold levels, the logic circuitry will indicate the beginning of a peak and the end of a peak, with provision for preventing correction signals between unresolved peaks. However, if during the time that the peak is in progress it is desired to reset the recorder to zero, the reset switch 30 can be depressed. When the reset switch 30 is pressed, the juncture between resistor 211 and capacitor 209 will become much less positive. The change in potential at this juncture point is differentiated by the capacitor 209 applied to the anode of silicon controlled rectifier as the negative going peak which is effective to turn the silicon controlled rectifier 150 off in the same manner as the negative going pulse from the collector of transistor 172. Thus, after operation of reset switch 30 the correction circuit will again correct the signal applied to the recorder to zero.

Figure 9:
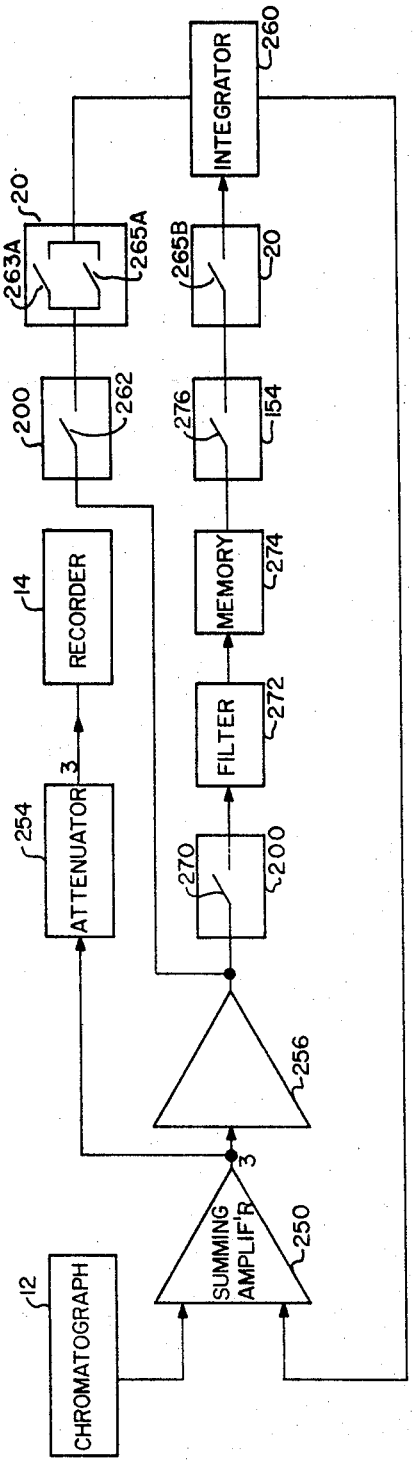
FIGURE 9 is a block diagram of the correction circuit in accordance with one embodiment of the present invention.

One preferred embodiment of the correction circuit 42 is shown in FIGURE 9 of the drawings and can be seen to comprise a summing amplifier 250 which it receives at one input an uncorrected signal from the chromatograph 12 and at its other input a correction signal from integrator 260. The output of the summing amplifier 250 is a signal corrected for base line drift, which is applied through an attenuator 254 to the recorder 14.

The output of the amplifier 250 is also applied to the input of amplifier 256 whose function is to amplify the signal to be operated on by the correction circuit. The output of the amplifier 256 is applied to the integrator 260 through contact 262 which is closed when the relay 200 of the logic circuit is energized and contacts 263a or 265a of the correct switch 20. The amplifier 256 is also connected to integrator 260 through a path comprising contact 270 of relay 200, filter 272, memory 274, contact 276 of relay 154 and contact 265b of switch 20. The switch 270 is closed when the relay 200 of the logic circuitry is energized. Switch 276 is closed when relay 154 is energized and contact 265b is closed only when the correct switch 20 is in the slope position.

It will be apparent from the above that the condition of contacts 262, 270, 276, 263a, 265a and 265b determine whether a signal is applied to the integrator 260. It will also be noted that relay 154 is energized, resulting in contact 276 being closed at all times that peak is in progress and that relay 200 is energized, resulting in the closure of contacts 262 and 270 at all times when a peak is not present except for the short time delay following the end of a peak.

The circuit represented in block diagram in FIGURE 9 of the drawings is quite similar to the circuit represented in block diagram in FIGURE 5 of the drawings, the slope detector circuit, in that the output of amplifier 250 is applied to an integrator with the output of the integrator being applied to one of the inputs of the summing amplifier, the other input to amplifier 250 being the uncorrected signal from the chromatograph. The signal appearing at the output of the amplifier 256 will therefore be a function of the slope of the uncorrected signal. If the slope of the uncorrected signal is zero, the corrected signal applied to the recorder will also be sufficiently small that it will not produce deflection of the recorder pen.

Thus, at all times when relay 200 is energized, indicating that a peak is not in progress, a signal will be applied to the input of the integrator 260 which varies as a function of the slope of the corrected signal. The integrator will generate and apply to the summing amplifier a correction signal equal to the value of the uncorrected signal, resulting in the output of the amplifier 250 being very small. When a peak is emerging, relay 154 of the logic circuit will become energized and relay 200 will become de-energized. If the correction switch 20 is in the flat position, contact 265b will be open and a signal will not be applied to the integrator 260 for the duration of the emerging peak and the time delay established by the logic circuitry thereafter. The correction signal applied to the amplifier 250 from the integrator 260 will therefore remain at a constant level from the beginning of the peak until the end of the time delay following termination of the peak. As indicated in FIGURE 1b of the drawings, any increase in the drift of the chromatograph during the period of the peak will result in an error.

It will also be noted that during the period of time when the relay 200 is energized, contact 270 will be closed and a signal which is a function of the slope of the uncorrected signal will be applied through the filter 272 to memory element 274. The output of the memory 274 is a voltage substantially equal to the voltage appearing at the output of amplifier 256 except that the output of the memory 274 will not change rapidly because of the action of filter 272. When the switch 270 is open responsive to relay 200 becoming de-energized, the output of the memory 274 will remain constant for a long period of time at a voltage substantially equal to the output of the amplifier 256 at the time relay 200 becomes de-energized.

Contact 265b of switch 20 will be closed when the correction switch 20 is in the SLOPE position and, upon the emergence of a peak, the contact 276 will close responsive to relay 154 becoming energized. An input will therefore be applied to the integrator 260 during the emergence of a peak from memory 274, the signal applied to the input of the integrator 260 being a function of the slope of the uncorrected signal immediately prior to the beginning of the peak. The correction signal applied to the input of the amplifier 250 will therefore be continually changing during the existence of the peak at a rate determined by the slope of the uncorrected signal prior to the peak. As indicated in FIGURE 1c of the drawings, this additional correction for the slope of the base line drift during the existence of a peak results in a corrected signal in which substantially no error will be present.

Figure 10:
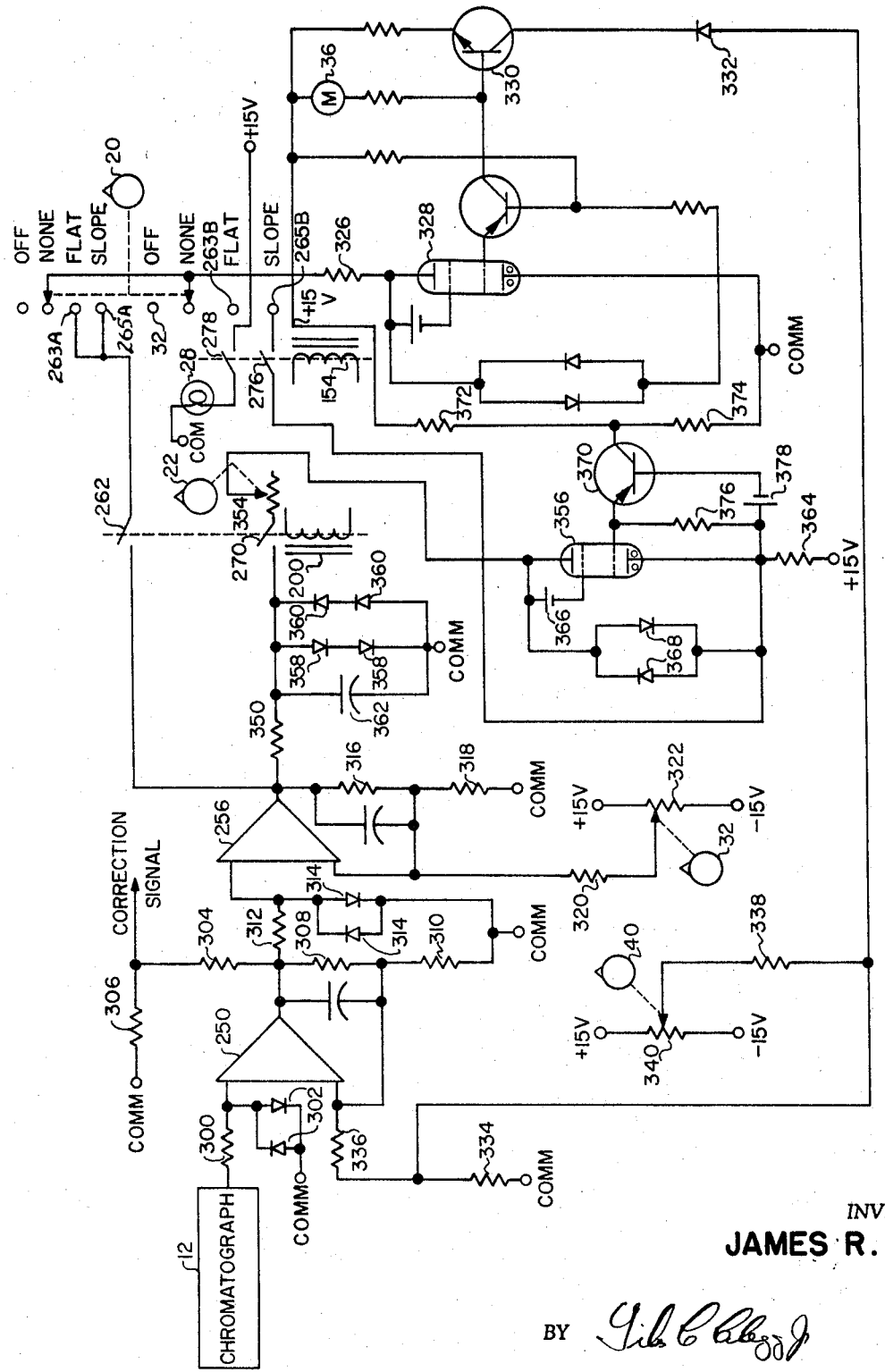

The correction circuit shown in block diagram form in FIGURE 9 of the drawings is shown schematically in FIGURE 10 of the drawings. Thus, the uncorrected signal is applied to one of the inputs of the amplifier 250 through resistor 300. The juncture between the resistor 300 and the input to the amplifier 250 is connected to common through a pair of oppositely poled parallel connected diodes 302. It will be apparent that the maximum potential that will be applied to the input of amplifier 250 will be limited to the forward voltage drop of diodes 302. In accordance with a preferred embodiment of the invention, the diodes 302 are silicon diodes having a forward voltage drop of approximately 0.35 volt at low current levels. The output of the amplifier 250 is applied to the recorder through a voltage divider network comprising resistors 304 and 306 connected to common from the output of the amplifier 250. Resistors 304 and 306 comprise the attenuator 254 of FIGURE 9. Resistors 308 and 310 are also connected to common, the juncture between resistors 308 and 310 being connected to the other input of the amplifier 250 providing feedback for the purpose of establishing a fixed gain for the amplifier 250.

The output of the amplifier 250 is also connected through a resistor 312 to amplifier 256. The input of amplifier 256 is connected to common through parallel oppositely poled diodes 314 which cooperate with resistor 312 to limit the input voltage applied to the amplifier 256 in the manner described previously. The output of the amplifier 256 is connected to common through resistors 316 and 318 with the juncture therebetween being connected to the second input of amplifier 256. Thus, a feedback path is provided for the purpose of establishing a fixed gain for the amplifier 256. It will be noted that amplifiers 250 and 256 are both characterized by an extremely high open loop gain and it is important that the input signal not be large to prevent damage to the amplifier.

The second input of amplifier 256 is also connected through a resistor 320 to the tap of potentiometer 322. One side of potentiometer 322 is connected to +15 volts and the other side is connected to −15 volts. When the recorder zero knob 32 on the face of the panel is operated, it will vary the position of the tap of potentiometer 322 for varying the potential applied to the second input of amplifier 256 to insure that correction signal provided by the circuit will provide a corrected signal of desired amplitude in the absence of a peak.

The output of the amplifier 256 is also connected through contact 262 of relay 200, either contact 263a or 265a of switch 20 and resistor 326 to the input electrode of a solion tetrode 328. The solion tetrode 328 is connected in a manner substantially identical to that of the solion tetrode 74 described in FIGURE 6 of the drawings. The meter 36 corresponds to meter 34 of FIGURE 6 and indicates whether the solion 328 is operating correctly. The collector of transistor 330 is connected through diode 332 to the juncture between resistors 334 and 336. The resistor 336 is connected to the other input of amplifier 250 and the other side of resistor 334 is connected to common. The juncture between resistors 334 and 336 is also connected through resistor 338 to the tap of potentiometer 340. Potentiometer 340 is connected between a source of +15 volts and a source of −15 volts. The tap of potentiometer 340 is controlled by correction adjust knob 40 on the control panel and a variation in the position of the tap will effect the indication shown on the correction meter 36.

It will be readily apparent that the portion of the circuitry of FIGURE 10 described to this point is substantially identical to the circuitry of FIGURE 6 and, as described with reference to FIGURE 6, the output of amplifier 256 will be a function of the slope of the uncorrected signal on the chromatograph. The signal applied to the amplifier 250 from the integrator 328 will always be substantially equal to the signal applied to the amplifier 250 from the chromatograph in the absence of a change in base line, resulting in the desired output level being applied to the recorder as long as the relay 200 of the logic circuitry is energized. In the event the slope of the base line drift is changing, a signal will appear at the output of amplifier 250 and at the output of amplifier 256 which will be a function of the slope of the base line. It will be noted that the error present varies as an inverse function of the gain of amplifier 250 and amplifier 256.

The output of amplifier 256 is also connected through resistor 350 and switch contact 270 to a variable resistor 354. The tap of the variable resistor 354 is connected to the input electrode of a solion tetrode 356. The position of the tap of variable resistor 354 is controlled by the damping control 22. A pair of series connected diodes 358 is connected in parallel with a pair of series connected diodes 360 between common and the juncture between resistor 350 and contact 270. Capacitor 362 is also connected between common and the juncture between resistor 350 and contact 270. The diodes 358 and 360 cooperate to limit the maximum potential appearing at the juncture between resistor 350 and contact 270 to twice the forward voltage of one of the diodes, or approximately 0.6 to 0.7 volt. The capacitor 362 is effective to bypass high frequency signals to common.

Solion tetrode 356 is connected in a manner dissimilar to that of the solion tetrodes described previously. Thus, the common electrode of solion 356 is connected through resistor 364 to +15 volts. Battery 366 is connected between the input shield electrode of the solion 356 in a conventional manner and oppositely poled parallel connected diodes 368 are connected between the input and common electrodes for protecting the device 356. The readout electrode of solion 356 is connected to the emitter of transistor 370. Resistors 372 and 374 are connected between a source of −15 volts and common, with the collector of transistor 370 being connected to the juncture between resistors 372 and 374. The readout electrode of solion 356 is also connected through resistor 376 to the common electrode and a battery 378 is connected between the common electrode of solion 356 and the base of transistor 370 for biasing the transistor 370.

When connected as above, current will flow through the circuit comprising resistor 372, the emitter-collector circuit of transistor 370, readout electrode of solion 356, the common electrode of solion 356 and resistor 364 between a source of −15 volts and a source of +15 volts, with the current flow being a function of the concentration of measured species within the readout compartment of the solion 356. When connected as described above, the solion 356 exhibits characteristics similar to that of a very large capacitor which is charged through a charge path comprising the damping resistor 354. Voltage at both the input and the common electrodes of solion 356 will be the same (the potential appearing at the input will be perhaps 20 millivolts greater than the potential appearing at the common electrode) and each will be a function of the voltage appearing at the output of the amplifier 356. Thus, so long as the relay 200 is energized, the potential appearing at the common electrode of the solion 356 will be a function of the slope of the uncorrected signal. When the relay 200 is de-energized, resulting in switch contact 352 becoming open, the voltage appearing at the common electrode of solion 356 will remain at a constant level which is a function of the slope of the uncorrected signal at the time that switch contact 352 was open.

Figures 10A, 12:
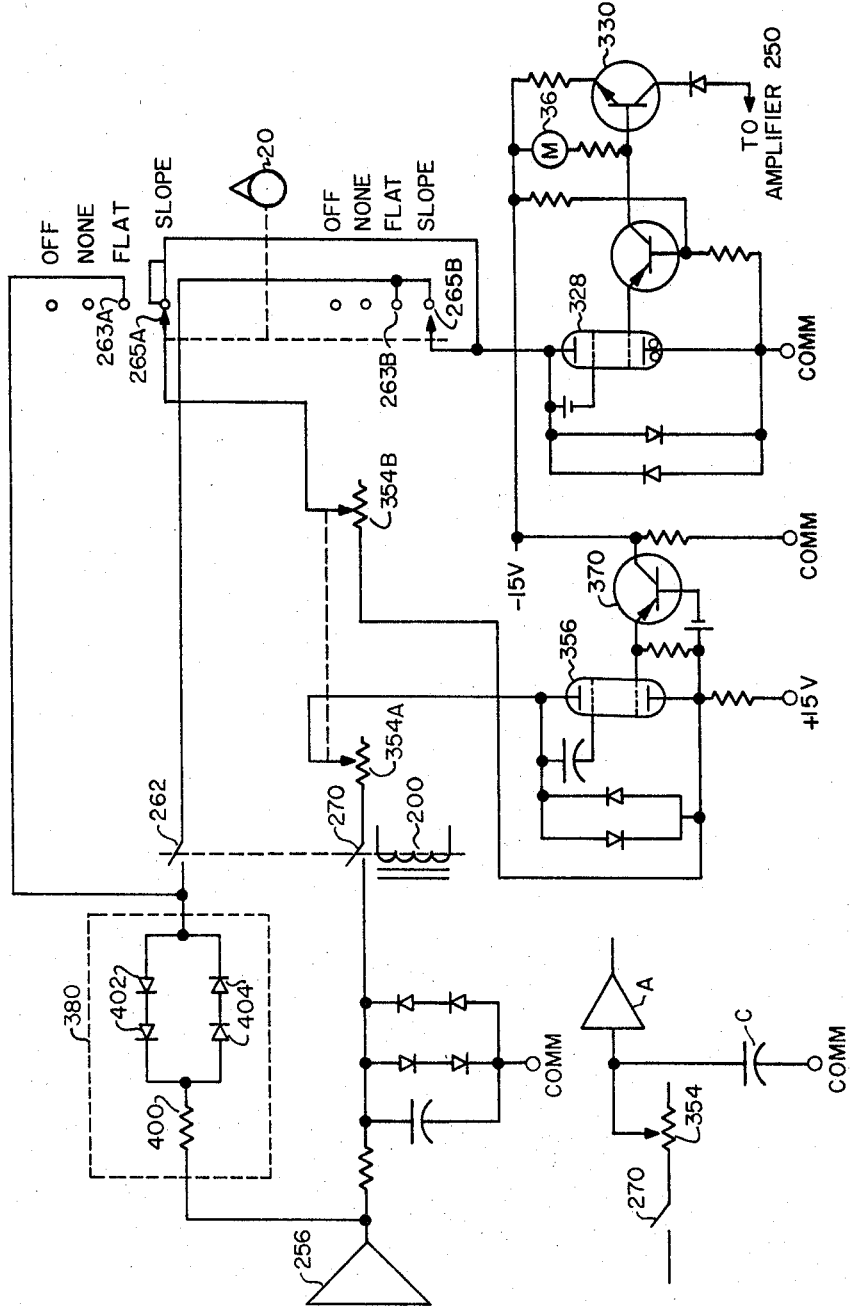
FIG. 10a is an equivalent circuit of a portion of FIG. 10.
FIGURE 12 is a schematic diagram further illustrating the embodiment of the correction circuit shown in FIGURE 11.

The resistor 354 and solion tetrode 356 cooperate to perform the function of the filter 272 and memory 274. An equivalent circuit of the resistor 354 and solion tetrode 356 is shown in FIGURE 10a and can be seen to comprise the resistor 354 connected in series with a capacitor C. The juncture between the resistor and capacitor is connected to the input of an amplifier A having a very high input impedance. Thus, when switch contact 270 is closed, the capacitor will be charged to a voltage which changes exponentially with time as a function of the applied voltage. The resistor and capacitor form a low pass filter with the output taken across the capacitor. When switch contact 270 is open, the charge on the capacitor will remain substantially constant, as the discharge path for the capacitor has a very high impedance (the input impedance of amplifier A). The output of amplifier A will therefore be a constant signal whose amplitude is determined by the charge on capacitor C, thereby providing a memory function.

The common electrode of solion 356 is connected through switch contact 276 to a contact 265b of switch 20. Contact 265b of switch 20 will be connected to solion 328 through resistor 326 when the switch 20 is in the slope position. Thus, when relay 154 is energized, indicating the emergence of a peak, switch contact 276 will be closed and, if the correct switch 20 is in the slope position, a signal which is a function of the slope of the uncorrected signal at the beginning of the peak will be continuously applied to solion 328 for the duration of the peak. The correcting signal applied to the other input of amplifier 250 during the peak will therefore be changed continuously at a rate dependent upon the slope of the uncorrected signal immediately prior to the peak. Since the slope of the uncorrected signal changes only very slowly except when a peak is in progress, excellent correction of base line drift is obtained. It will also be noted that when relay 154 is energized, contact 278 will close, applying power to lamp 27.

Figure 11:
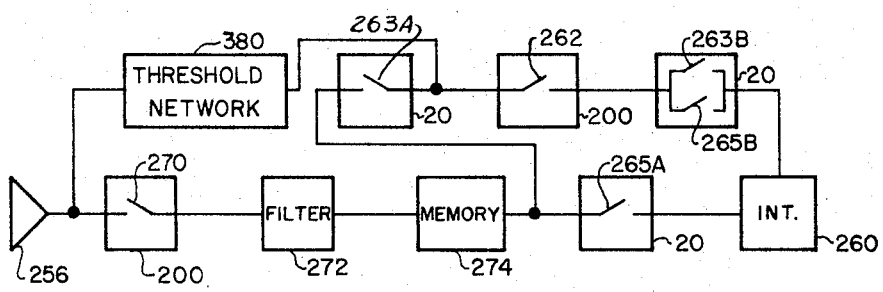
FIGURE 11 is a block diagram illustrating a second embodiment of the correction circuit utilized in the drift corrector.

A somewhat different embodiment of the correction circuit is shown in FIGURES 11 and 12 of the drawings. Since the drift correcting circuit of FIGURES 11 and 12 is similar in many respects to the drift correcting circuit shown in FIGURES 9 and 10, the same reference characters have been applied to the same parts, when applicable, and only that portion of the circuit which is different from that shown in FIGURES 9 and 10 has been shown. Thus, the amplifier 256 is connected to integrator 260 through a threshold network 380 and switch contact 262 of relay 200 and contacts 263b or 265b of switch 20. The output of amplifier 256 is also connected to the integrator 260 through switch contact 270, filter 272, memory 274 and switch contact 265a of switch 20. The output of memory 274 is also connected through switch contact 263a of switch 20 to the juncture between threshold network 380 and switch contact 262. The output of the integrator 260 is applied to one of the inputs of amplifier 250 as described previously.

As mentioned previously with reference to FIGURE 10, the voltage appearing at the common electrode of the solion 356 of memory 274 changes exponentially with time as a function of the voltage appearing at the output of amplifier 256. In accordance with this second embodiment of the invention, rather than connect the solion tetrode 328 comprising the integrator 260 directly to the amplifier 256, the integrator 260 normally receives its signal from memory 274. Only when the signal out of the amplifier 256 becomes in excess of a threshold level set by the threshold network 380 is a signal applied to the integrator directly from the amplifier 256.

Turning now to FIGURE 12 of the drawings, it will be seen that the second embodiment of the control correction circuit is quite similar to the first embodiment of the correction circuit in that the solions 356 and 328 are each connected in a manner substantially the same as that described with reference to FIGURE 10 of the drawings. The circuits of FIGURES 10 and 12 are different in that two variable resistances 354a and 354b are utilized, the switch connections are different, and a threshold network is provided. The input electrode of solion tetrode 356 is connected to the output of amplifier 256 through contact 270 and variable resistance 354a, in a manner quite similar to that described with reference to FIGURE 10. The common electrode of solion 356 is connected through variable resistor 354b and contact 265a of switch 20 to the input of solion tetrode 328. It will be noted that switch contact 276 operated by relay 154 is not utilized in this second embodiment of the invention.

The output of amplifier 256 is connected to one side of contact 262 by a threshold network comprising resistor 400 and a diode circuit comprising a pair of series connected diodes 402 connected in parallel with a pair of series connected diodes 404. It will be noted that the diodes 402 and 404 are poled oppositely and that current will flow through one pair of diodes 402 or 404 only if the voltage appearing at the output of amplifier 256 becomes greater than the forward voltage drop of two of the diodes, or in the order or 0.6 to 0.7 volt. The juncture between the diodes 402 and 404 and the switch 324 is connected to contact 263a of switch 20. The other side of switch 262 is connected through contacts 263b or 265b of switch 20. It will be noted that the switch 20 is suitably a wafer switch having several wafers with the movable elements associated with the wafers ganged together.

So long as the potential appearing at the output of amplifier 256 is less than the forward voltage drop of one pair of the diodes 402 or 404, current will not flow through the threshold network 380. However, if relay 200 is energized, switch contact 270 will be closed and a potential will appear at the common electrode of solion 356 which is a function of the slope of the uncorrected signal. If switch 20 is in the SLOPE position, the potential appearing at the common electrode of solion 356 will be applied through the resistor 354b and contact 265a of switch 20 to the input electrode of solion 328. If the correction switch is in the FLAT position, the common electrode of solion 356 will be connected through resistor 354b, switch contact 263a and switch contact 262 (which will be closed when relay 200 is energized) and contact 263b to the input electrodes of solion 328. If the correction switch 20 is in either the FLAT or SLOPE position, switch 262 will be connected through contact 263b or 265b, respectively, of switch 20 to the input electrode of solion 328.

Thus, in the absence of a peak and after the desired time interval following the peak, relay 200 will be energized, causing switch contacts 262 and 270 to be closed. A voltage will appear at the common electrode of solion 356 which changes exponentially with time as a function of the slope of the uncorrected signal. With the correction switch in either the FLAT or SLOPE position, the potential appearing at the common electrode of solion 356 is applied to the input electrode of solion 328. Solion 328 will be effective to apply to the other input of amplifier 250 a correction signal to cause the output of amplifier 250 to be near zero.

As mentioned previously, the resistor 354a and solion 356 function in a manner similar to that of a filter. In the event of a sudden change in base line drift, but a change not sufficiently large to be classified as a peak, the output of amplifier 256 will increase to a level sufficient that current will flow through the threshold network 380 and switch 262 to the input electrode of solion 328, causing the correction signal to change at a much greater rate than if the solion 328 received an input signal only from the solion 356.

The resistor 354b is provided to prevent instability in the correction loop. Instability, with resultant oscillation, is possible since both solions 356 and 358 provide approximately 90° phase shift at same frequency, and if sufficent amplification is present, oscillation will result. In practice, the control 22 is set to provide the desired degree of damping, the size of resistor 354b being designed to prevent oscillation. If maximum sensitivity is desired, a separate control for resistor 345b can be provided. For any setting of 345a, resistor 345b would then be reduced until oscillation appears. The resistance of resistor 354b would then be increased until sufficient damping is provided to end oscillation of the circuit.

Upon the slope detection circuitry indicating the beginning of a peak, the relay 200 of logic circuit will become de-energized and switches 262 and 270 will open. If correction switch 20 is in the FLAT position, additional signal will not be applied to the input of solion 328 until relay 200 is again energized and the correction signal applied to the input of amplifier 250 will remain at a constant level. If the correction switch 20 is in the SLOPE position, the common electrode of solion 356 will be connected to the input of the electrode of solion 328 even though the relay 200 is de-energized, and during the duration of the peak the integrator solion 328 will receive a signal from the solion 356 which is a function of the slope of the uncorrected signal at the beginning of the peak, resulting in the correction signal continuing to change during the existence of the peak at a rate determined by the slope of the uncorrected signal at the beginning of the peak.

The foregoing description is intended to be illustrative and not limiting of the invention defined in the claims, since many changes and modifications will become apparent to those skilled in the art in view of the preferred embodiments of the invention shown and described herein.

What I claim is:

1. Apparatus for correcting an instrument signal for base line drift that comprises:
    (a) differential amplifier means having two inputs and an output;
    (b) means for connecting said instrument signal to one of the inputs of said differential amplifier means;
    (c) integrating means for producing an output signal which is the integral of the signal applied to its input;
    (d) means for connecting the output of said differential amplifier means to the input of said integrating means
    (e) means connecting the output of said integrating means to the second of the inputs of said differential amplifier means;
    (f) said differential amplifier means having a sufficiently high gain that the output of said integrating means will be substantially equal to the instrument signal;
    (g) means for disconnecting the input of said integrating means from the output of said differential amplifier means responsive to the presence of a peak on said information signal, and
    (h) memory means connected to the output of said differential amplifier means for producing at its output a signal which is a function of the output of said differential amplifier means and means responsive to the presence of a peak for disconnecting said last named means from said differential amplifier means and connecting the output of said last named means to the input of said integrating means.

2. Apparatus as defined in claim 1 wherein said last named means comprises switching means connected in series between the output of said differential amplifier means and said integrating means, and means for opening said switching means responsive to the slope of said information signal being positive and at least equal to a first level and for closing said switching means responsive to the slope of said information signal becoming negative and at least equal to a second level then less than said second level.

3. Apparatus for correcting signal drift comprising:
    (a) means for producing a signal proportional to the derivative of an instrument output signal;
    (b) memory means for storing said derivative signal; and
    (c) switching means responsive to the slope of the instrument output signal for selectively connecting and disconnecting said memory means into a drift correction circuit, said drift correction circuit comprising signal summing means in combination with signal integrating means, the output of said integrating means being connected to a negative input of said summing means and a positive input of said summing means being connected to said instrument output signal.

4. Apparatus for correcting an instrument signal for base line drift that comprises:
    (a) differential amplifier means having two inputs and an output;
    (b) means for connecting said instrument signal to one of the inputs of said differential amplifier means;
    (c) integrating means for producing an output signal which is the integral of the signal applied to its input;
    (d) means for connecting the output of said differential amplifier means to the input of said integrating means;
    (e) means connecting the output of said integrating means to the second of the inputs of said differential amplifier means;
    (f) said differential amplifier means having a sufficiently high gain that the output of said integrating means will be substantially equal to the instrument signal; and
    (g) switching means connected in series between the output of said differential amplifier means and said integrating means and means for controlling the operation of said switching means responsive to the slope of said instrument signal.

5. Apparatus for correcting an instrument signal for base line drift that comprises:
    (a) first and second differential amplifier means, each having two inputs and an output;
    (b) means for applying said instrument signal to one of the inputs of each of said first and second differential amplifier means;
    (c) first integrating means for producing an output signal which is the integral of the signal applied to its input;
    (d) switching means connecting the output of said first differential amplifier means to the input of said first integrating means;
    (e) means connecting the output of said each first and second integrating means to the second of the inputs of said first and second differential amplifier means;
    (f) second integrating means for producing an output signal which is the integral of the signal applied to its input;
    (g) means connecting the output of said second differential amplifier means to the input of said second integrating means;
    (h) said first and second differential amplifier means each having a sufficiently high gain that the output of said first and second integrating means respectively will be substantially equal to the instrument signal whereby the output of each said amplifier means will be substantially equal to the differential of said instrument signal; and (i) means effective responsive to the amplitude of the output of said second amplifier means for operating said switching means to disconnect the input of said first integrating means from the output of said first differential amplifier means responsive to the output of said first amplifier means being of one polarity and of at least a first selected value and for closing said switching means responsive to the output of said first amplifier means being of a different polarity and of at least a second selected value and thereafter less than said second selected value.

6. Apparatus as defined in claim 5 wherein said last named means further includes time delay means connected for operating said switching means to close said switching means a time interval following the output of said second amplifier becoming negative and of at least said second selected value and then negative and less than said second selected value.

7. Apparatus as defined in claim 5 further including memory means for providing an output signal which is the function of the signal applied to its input, second switching means connecting the input of said memory means to the output of said first differential amplifier means, third switching means connecting the output of said memory means to the input of said first integrating means, and means for operating said second switching means in the open condition and said third switching means in the closed position responsive to the output of said second amplifier means being positive and of at least a first selected value and for closing said second switching means and opening said third switching means responsive to the output of said second differential amplifier means becoming negative and of at least said second selected value and thereafter becoming negative and of less than said second selected value.

8. Apparatus as defined in claim 5 wherein said first and second integrating means each comprise an electrical readout integrator.

9. Apparatus as defined in claim 7 wherein said memory means comprises an electrical readout integrator.

10. Apparatus as defined in claim 7 further including filter means connected between the input of said memory means and the output of said first differential amplifier means.

11. Apparatus for correcting an instrument signal base line drift comprising first, second and third differential amplifiers each having first and second inputs and an output, first and second electrical readout integrators each having input, readout and common electrodes, means for connecting the instrument signal to said first input of the first and second differential amplifiers, signal attenuating means connected to the output of the first differential amplifier for applying a signal corrected for base line drift to a recording means, means connecting the output of the first differential amplifier to said first input of the third differential amplifier, a feedback circuit associated with each differential amplifier connecting the output of each said differential amplifier to its second input, means including first switching means connecting the output of said third differential amplifier to the input electrode of the first electrical readout integrator, means connecting each said first and second electrical readout integrators to function as an integrator whereby the signal appearing at its readout electrode is an integral of the signal applied to its input electrode, means connecting the readout electrode of said first and second electrical readout integrators to the second input of the first and second differential amplifiers respectively, means connecting the output of the second differential amplifier to the input electrode of the second electrical readout integrator, and means responsive to the character of the signal appearing at the input to the second electrical readout integrator for opening said first switching means during the presence of a peak and closing said first switching means when a peak is not present.

12. Apparatus as defined in claim 11 further including means effective responsive to the presence of a peak for applying to said first electrical readout integrator a signal which is a function of the slope of the instrument signal during a time interval immediately preceding emergence of said peak.

13. Apparatus as defined in claim 11 further including a third electrical readout integrator having an input, common and readout electrodes, means connecting said third electrical readout integrator to function as a capacitor, means including second switching means connecting the output of said third differential amplifier to the input electrode of said third electrical readout integrator, means connecting the common electrode of said third electrical readout integrator to the input electrode of said first electrical readout integrator, said means responsive also being effective to operate said second switching means in a manner common to said first switching means.

14. Apparatus as defined in claim 11 wherein said means responsive comprises a meter relay having operative terminals connected in series with the input electrode of said second electrical readout integrator and the output of said second differential amplifier, first and second bistable means each having two mutually maintained opposite states, means effective responsive to said first bistable means exhibiting a first state for closing said first switching means and for opening said first switching means responsive to said first bistable means exhibiting its other state, means effective responsive to deflection of said meter relay in a direction indicative of a positive slope of said instrument signal to a first selected point for operating said first bistable means to its other state and means responsive to deflection of said meter relay in an opposite direction indicative of negative slope of said instrument signal to a second selected point followed by a decrease in the deflection of said meter relay for operating said first bistable means to its first state.

15. Apparatus as defined in claim 14 further including time delay means connected to prevent operation of said first bistable means from the other to the first state for a time interval following the decrease in deflection of said meter relay from said second selected point.

16. Apparatus as defined in claim 13 further including threshold means connected between the output of said third differential amplifier and the input of said first electrical readout integrator for applying to said first electrical readout integrator a signal responsive to the potential appearing at said threshold means being in excess of a threshold level when said first switching means is closed.

17. Apparatus as defined in claim 13 wherein said means connecting the common electrode of said third electrical readout integrator to the input electrode of said first electrical readout integrator includes a normally open switch contact, said means responsive to the character of the signal appearing at the input to the second electrical readout integrator being effective to close said normally open switch when a peak is present.

18. Apparatus for correcting an instrument signal for base line drift comprising integrating means having an input and an output, switching means for applying to the input of said integrating means a first signal which is a function of the slope of the instrument signal, said integrating means being effective to produce at its output a second signal substantially equal to said instrument signal when said switching means is closed, said second signal remaining substantially constant in amplitude in the absence of the signal applied to its input, and control means coupled to said switching means for opening said switching means responsive to the slope of the instrument signal becoming positive and of at least first selected value and for closing said switching means a time interval following the slope of said instrument signal becoming negative and of at least a second selected value and thereafter becoming less than said second selected value.

References Cited

UNITED STATES PATENTS 3,237,110 2/1966 Kaye _____ 328—120
3,264,573 8/1966 Lefferts.
3,287,575 11/1966 Widl _____ 328—164
3,304,508 2/1967 Danielsen et al. _____ 328—164

JOHN S. HEYMAN, *Primary Examiner.*

U.S. Cl. X.R.

328—127, 114; 307—311